Patented Sept. 4, 1951

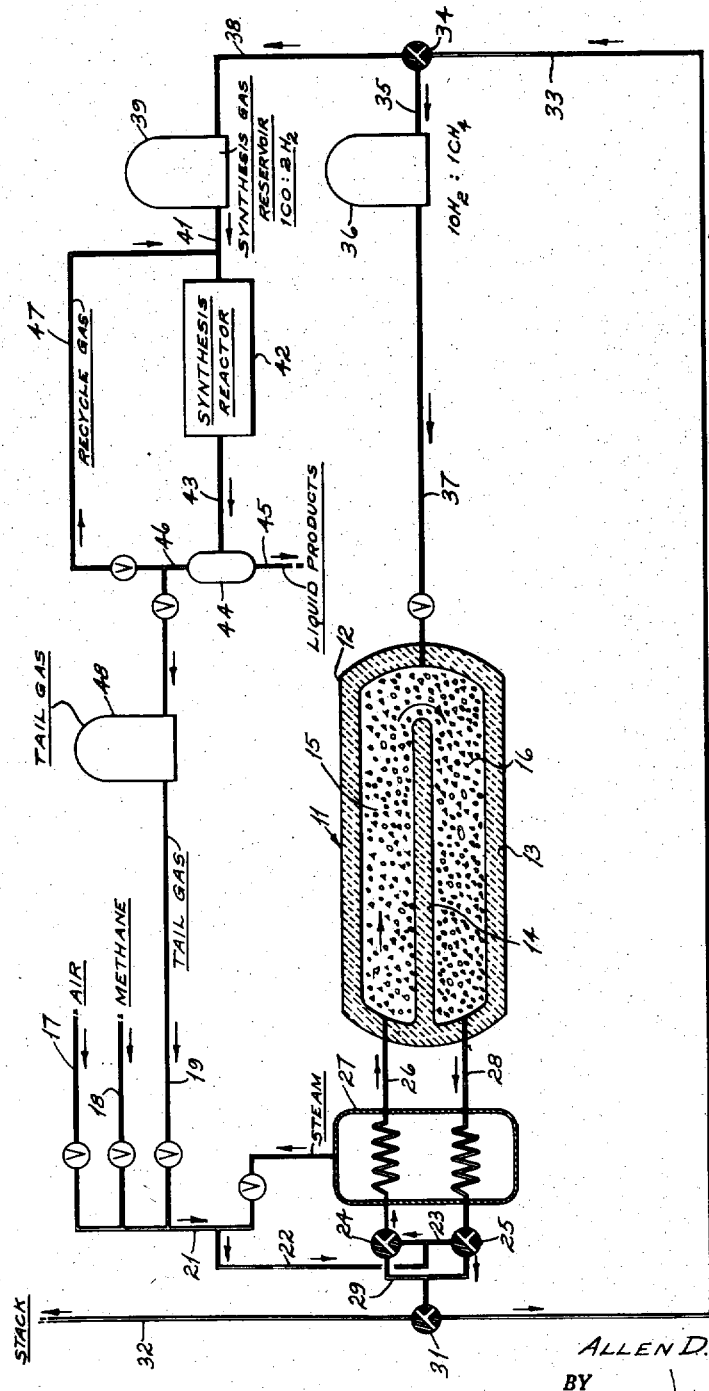

2,566,936

UNITED STATES PATENT OFFICE 2,566,936

PROCESS FOR PREPARING SYNTHESIS GASES

Allen D. Garrison, Houston, Tex., assignor to Texaco Development Corporation, New York, N. Y., a corporation of Delaware Application January 4, 1947, Serial No. 720,272

3 Claims. (Cl. 252—373)

This invention relates to a process for the preparation of synthesis gas for the synthesis of hydrocarbons, oxygenated compounds and the like.

Prior methods of preparing synthesis gas, consisting essentially of carbon monoxide and hydrogen, for the synthesis of hydrocarbons, oxygenated compounds and the like have involved the reaction of a hydrocarbon such as methane with sustantially pure oxygen or carbon dioxide. In the quantities necessary, the latter gases are expensive by reason of the initial outlay required for the plant equipment and the cost of its continued operation. The use of carbon dioxide is further objectionable because of the heat losses involved and the necessity of making up such losses from an extraneous source.

In eliminating such costs and the necessity for equipment for producing such gases as oxygen and carbon dioxide in a substantially pure state, it is an object of this invention to provide a novel process of preparing synthesis gas wherein only readily available and relatively inexpensive starting materials are required such as steam, air and a hydrocarbon or other carbon-containing material such as natural gas.

A further object of this invention is the provision of a novel process wherein substantially all the carbon content of the hydrocarbon is utilized in the preparation of the synthesis gas.

Still a further object of the invention is to provide a novel process wherein substantially all the tail gas from the synthesis reactor can be utilized in a highly efficient manner in the generation of the synthesis gas.

In brief, the present invention involves the use of a refractory zone containing material capable of both exchanging heat with a fluid passing therethrough and retaining particles of solid carbon, the latter being accomplished by the use of a highly porous material capable of withstanding high temperatures coupled with a low space velocity as regards the fluid passing therethrough.

In its heated state, the refractory functions to effect cracking of hydrocarbon, the gaseous products thereof being collected, and to cause the reaction of the hydrocarbon with steam and tail gases from the synthesis step to produce the desired synthesis gas, such operations being discontinued on cooling of the refractory zone below a temperature at which they can be efficiently carried on, the gaseous products from the cracking step being returned to the refractory and utilized in combination with an oxygen-containing gas such as air to reheat the refractory zone.

Turning to the drawing wherein a preferred embodiment of the invention is shown diagrammatically, 11 indicates a generator formed of a steel shell 12 having a refractory lining 13 and a central partition 14 extending from one end of the generator to a point spaced from the opposite end of the generator. Partition 14 is likewise formed of refractory material capable of withstanding high temperatures. The interior of generator 11 is packed with a highly porous refractory material, such as porous lumps of pure magnesium oxide, zirconium oxide or the like, capable of withstanding high temperatures. This packing is evenly distributed throughout the upper section 15 of the generator and the lower section 16. A high porosity is desired in order that the packing will tend to collect and retain solid carbon formed by the reactions taking place in the generator.

Valve controlled lines 17, 18 and 19 are provided for the feed of an oxygen-containing gas such as air, a carbon-containing material such as natural gas, and tail gas from the synthesizing step, respectively. These lines connect with a header 21, line 22 and line 23, the latter being controlled at its opposite ends by three-way valves 24 and 25. Valve 24 is connected to section 15 of the generator by line 26 passing through a preheater in the form of a waste heat boiler 27 and valve 25 is connected to section 16 of the generator by a line 28, also passing through preheater 27. Valves 24 and 25 are also connected by a manifold 29 to a three-way valve 31 having a connection 32 to an exhaust stack and a connection 33 to a three-way valve 34. Valve 34 is connected by line 35 to a gas storage chamber 36 which in turn is connected to the right end of the generator by a valve controlled line 37. Valve 34 is also connected to a line 38 leading to a synthesis gas reservoir 39 which in turn is connected by a line 41 to a synthesis reactor 42. The products from the synthesis reactor are conveyed by line 43 to a separator 44, the liquid products being removed through a line 45 and the gaseous products returned to a valve-controlled line 46 for recycle into the synthesis reactor through a valve-controlled line 47 or storage in a tail gas reservoir 48.

In practicing the process, natural gas being selected by way of example as the hydrocarbon being processed, an oxygen-containing gas, air being preferred because of its inexpensive character, is fed through lines 17, 21, 22, 23, valve 24 and line 26 to section 15 of the generator.

Simultaneously, hydrogen and methane in about the molecular ratio of 10 hydrogen to 1 methane is fed into the generator through line 37 from reservoir 36, this supply of gases having been previously obtained in a manner to be described. The air, the hydrogen and the methane are thoroughly mixed and burned in chamber 16 of the generator, thus bringing the refractory material therein to a very high temperature. By alternately introducing the air through valves 24 and 25 so that the air enters first through section 15 of the generator and then through section 16 of the generator, both sections of the generator can be brought to a very high temperature, well in excess of 3600° F. and approximating 4000° F. It will be noted that the products of combustion are returned through preheater 27 which may be of the water type whereby steam is generated therein, the products being eventually returned to valve 31 and line 32 where they are discharged through a stack.

Assuming that sections 15 and 16 of the generator have been brought to the desired temperature, the flow of air, hydrogen, and methane to the generator is shut off. The hydrocarbon is then admitted at a pressure of about 250 pounds per square inch gauge through lines 18, 21, 22, 23, valve 24, preheater 27 where it is preheated to about 400° F. and line 26 to section 15 of the generator wherein by reason of the high temperature therein the gas is cracked as follows:

(1) $CH_4 \rightarrow C + 2H_2$

As already stated the refractory packing is designed to hold up and retain the solid carbon formed in the reaction, the hydrogen with some uncracked methane being discharged by line 28 through waste heat boiler 27 through line 29, valve 31, line 33, valve 34 and line 35 to gas reservoir 36 where it is stored for use in the next heating stage. When the proper amount of carbon has been deposited in the generator, and the temperature of the packing therein has dropped to a range approximating 3000-3400° F. whereat the cracking begins to slow down, steam from waste heat boiler 27 at a pressure of 250 pounds per square inch gauge and a temperature of about 400° F. is introduced into line 21 with the natural gas, and tail gas, consisting principally of carbon monoxide, hydrogen, carbon dioxide and methane, is introdced through line 19 into line 21 in a desired amount from gas reservoir 48. The gases mix in lines 22 and 26 passing through waste heat boiler 27 where they are preheated to a temperature in the range of 400° F. and enter section 15 of the generator, valve 34 being set so that the products pass through line 38 to synthesis gas reservoir 39.

The first reaction that takes place in the generator is at a relatively high temperature and proceeds as follows:

(2) $CH_4 + H_2O \rightarrow CO + 3H_2$

The subsequent reactions which take place at lower temperatures as the packing gradually gives up its heat to the entering gases are as follows:

(3) $C + H_2O \rightarrow CO + H_2$ (4) $CO_2 + C \rightarrow 2CO$

In this stage the proportions of the gases charged can be adjusted as desired to provide the desired molecular ratio of approximately 1 carbon monoxide to 2 hydrogen desired for the synthesis gas.

The synthesis gas from reservoir 39 is processed in any desired type of synthesis reactor 42 in well known manner to produce hydrocarbons, oxygenated compounds and the like, the liquid products including water being separated in separator 44. The tail gas from separator 44 may be stored in reservoir 48 or partly recycled through the synthesis reactor through line 47, if desired. Such tail gases contain the unused carbon monoxide and hydrogen and some carbon dioxide and methane.

When the temperature of the packing in the generator has lowered to an extent such that the above noted reactions do not occur at an efficient rate, about 1600-1800° F. the flow of tail gas, steam and methane is shut off and the previously explained heating stage resumed with the admission of air through line 17 and hydrogen and methane through line 37.

Each stage of the cycle usually approximates 3 to 10 minutes in length and the valves controlling them can be operated automatically in well known manner.

The following equations represent an example of the relative amounts of the different gases used in one complete cycle consisting of the three stages already described.

In the first stage, or the heating stage, the following equations apply:

(5) $CH_4 + 2O_2 + 8N_2 \rightarrow CO_2 + 2H_2O + 8N_2$ (6) $10H_2 + 5O_2 + 20N_2 \rightarrow 10H_2O + 20N_2$ All the resulting products of the above reactions are discharged to the stack. The heat available from the above reactions is approximately as follows:

Heat available:

| | Calories |
|---|---|
| $\Delta H_5 =$ | $-210,000$ |
| $\Delta H_6 =$ | $-578,000$ |
| $\Delta H$ total | $-788,000$ |

In the second stage wherein some of the methane is cracked and the temperature of the packing reduced from over 3600° F. to about 3200° F., and some of the methane is passed through uncracked, the heat can be figured as follows:

(7) $5CH_4 \rightarrow 5C + 10H_2$ (8) $1CH_4$ (passed through, not cracked) $\rightarrow 1CH_4$ Heat required: Standard $\Delta H_7 = +90,000$ calories. In this stage, the carbon remains in the generator and the methane and hydrogen pass to reservoir 36.

In the third stage wherein the synthesis gas is formed, the temperature of the packing dropping from about 3200° F. to 1800° F., the following equations apply:

(9) $10H_2O + 5CH_4 + 5C \rightarrow 10CO + 20H_2$

(10) $xCO$ in tail gas $\rightarrow xCO$

(11) $yCO_2$ in tail gas $+ yC \rightarrow 2yCO$

(12) $zCH_4$ in tail gas $+ zH_2O \rightarrow zCO + 3zH_2$

Heat required: $\Delta H_9 = +400,000$ calories. The heat required for 10, 11 and 12 are dependent on the values of $x$, $y$ and $z$.

The total heat required for the second and third stages equals approximately 490,000 calories plus the heat required for reactions 10, 11 and 12. As almost 800,000 calories are available, it is apparent that there is a liberal excess over and above that utilized in waste heat boiler 27 for steam generation.

While natural gas consisting chiefly of methane has been described in the foregoing example as the hydrocarbon used, it is to be understood that other carbon-containing materials, for instance, solids such as pulverized coal, liquids such as fuel oil and kerosene, and other hydrocarbon gases may be used in place of natural gas or other gaseous hydrocarbons. In such cases, it will be understood that the various proportions of steam and tail gas may have to be varied in accordance with well known practice to obtain the desired synthesis gas.

A salient feature of the process is the ability to heat refractory packing in the generator to a very high temperature in the order of 3600° F. and above, this being accomplished by alternating the direction of flow of the air, hydrogen and methane whereby the refractory packings in sections 15 and 16 are alternately and progressively heated as distinguished from a typical regenerative set-up wherein one section of packing is usually used for storing heat and the reaction with steam immediately conducted in the same section of packing.

The maximum temperature of the packing is limited only by its melting point and the melting point of the refractory lining for the generator shell.

Another feature of the invention is the cracking of part of the hydrocarbon directly to carbon and hydrogen and the characteristic of the packing such that it retains the carbon while permitting the hydrogen and uncracked hydrocarbon to pass therethrough. The uncracked hydrocarbon is not lost but is made available for heating in the next heating stage. By employing a packing of very porous character with a low space velocity, and so retaining the carbon, the carbon monoxide to hydrogen ratio can be effectively controlled. The reaction of a hydrocarbon such as methane and steam which normally goes to carbon monoxide and three mols of hydrogen produces too much hydrogen for the usual synthesis and is exceedingly difficult to carry to completion. By removing the hydrogen formed in the cracking stage, the carbon monoxide to hydrogen ratio is correspondingly lowered, the hydrogen not being wasted but utilized in the heating stage as fuel.

Another feature of the invention resides in the use of the steam carbon reaction, i. e., $$H_2O + C \rightarrow CO + H_2$$

after the packing has cooled to a temperature too low to continue to crack the hydrocarbon but is still sufficiently hot to complete this reaction.

An additional feature is the substantially complete utilization of the carbon derived from the hydrocarbon. With a waste heat boiler having good thermal insulation and of high efficiency, the uncracked methane is not wasted but collected in the storage reservoir 36 and eventually consumed in the generator. Theoretically, the burning of the hydrogen alone in the heating step, that is the first stage of operation, provides sufficient heat to heat the packing to the temperature required to conduct the subsequent stage of operation.

The major advantages of the process of this invention may be summed up as follows: (1) a relatively high conversion of hydrocarbon into carbon monoxide and hydrogen with a very low loss of hydrocarbon; (2) the use of excess hydrogen as fuel and the inherent purging of nitrogen so that nitrogen does not appear in the synthesis gas; (3) the ease of insulation and heat recovery; (4) the low cost of equipment and low cost of subsequent operation compared with generating methods which employ substantially pure oxygen or carbon dioxide as the source of oxygen; and (5) a complete recycle and utilization of all the tail gas from the synthesis reactor.

Obviously, many modifications and variations of the invention as above set forth may be made without departing from the spirit and scope thereof and only such limitations should be imposed as are indicated in the appended claims.

I claim:

1. In the process for preparing a synthesis gas composed essentially of hydrogen and carbon monoxide in the molar ratio approximating 2:1 for the synthesis of hydrocarbons, oxygenated hydrocarbons and mixtures thereof, wherein a hydrocarbon gas and steam are passed in direct contact with a heated refractory material in a reaction zone, at a reaction temperature in the range at which the reactants interact endothermically to form hydrogen and carbon monoxide, and wherein the refractory material in the reaction zone is periodically heated to reaction temperature, the improvement which comprises effecting the conversion of the feed hydrocarbon gas into high yields of synthesis gas having a molar ratio of $H_2$ and $CO$ of approximately 2:1 under substantially thermally self-contained conditions by the steps including passing a hydrocarbon gas in contact with the heated refractory material at a temperature in the range effective to substantially crack the hydrocarbon gas to form gaseous products of cracking and deposit resultant solid carbon upon the refractory material, recovering the said gaseous products of cracking, thereafter passing a mixture of additional hydrocarbon gas and steam in contact with the refractory material and carbon at a relatively lower temperature in the range at which steam reacts with both the deposited carbon and the hydrocarbon gas, and regulating the proportion of hydrocarbon gas and steam such that the oxidation product is a synthesis gas comprising hydrogen and carbon monoxide in the molar ratio of approximately 2:1.

2. In a process for the production of a mixture of hydrogen and carbon monoxide in the molar ratio of approximately 2:1 from a gaseous hydrocarbon wherein a bed of refractory material is heated to a temperature above that required for cracking of said hydrocarbon to carbon and gases, said hydrocarbon only is thereafter passed into contact with said heated refractory with the resultant production of gaseous products of cracking and deposition of free solid carbon on the refractory material and said gaseous products of cracking are withdrawn from contact with said refractory material, the improvement which comprises passing a mixture of steam and said hydrocarbon gas and containing at least two mols of steam per mol of gas into contact with the resulting carbon at a temperature level above about 1,600° F. at which the steam reacts with the said carbon and said hydrocarbon with the production of hydrogen and carbon monoxide in the ratio of approximately 2:1.

3. A process for the production of a mixture of hydrogen and carbon monoxide in the molar ratio of approximately 2:1 from a gaseous hydrocarbon, comprising heating a bed of refractory material to a temperature above about 3,600° F.

thereafter passing only said hydrocarbon gas into contact with said heated refractory with the resultant production of gaseous products of cracking and the deposition of free solid carbon on the refractory material, continuing said cracking until said refractory is reduced to a temperature in the range of 3,000° F. to 3,400° F., withdrawing the gaseous products of cracking from contact with said refractory material, and thereafter passing a mixture of steam and said hydrocarbon gas into contact with the resulting carbon on said refractory material at a temperature within the range of from about 1,800° F. to said reduced temperature thereby effecting reaction of steam with said carbon and said hydrocarbon with the production of hydrogen and carbon monoxide having a molar ratio of approximately 2:1.

ALLEN D. GARRISON.

REFERENCES CITED

The following references are of record in the file of this patent:

UNITED STATES PATENTS

| Number | Name | Date |
| --- | --- | --- |
| 1,762,100 | Odell | June 3, 1930 |
| 1,875,923 | Harrison | Sept. 6, 1932 |
| 1,903,845 | Wilcox | Apr. 18, 1933 |
| 2,071,286 | Johnson et al. | Feb. 16, 1937 |
| 2,178,824 | Atwell | Nov. 7, 1939 |
| 2,243,869 | Keith et al. | June 3, 1941 |
| 2,421,744 | Daniels et al. | June 10, 1947 |

Certificate of Correction

Patent No. 2,566,936 September 4, 1951

ALLEN D. GARRISON

It is hereby certified that error appears in the printed specification of the above numbered patent requiring correction as follows:

Column 4, line 31, for "$10H_2+5O_2+2ON_2 \rightarrow 10H_2O+2ON_2$" read
$10\ H_2+5\ O_2+20\ N_2 \rightarrow 10\ H_2O+20\ N_2$ and that the said Letters Patent should be read as corrected above, so that the same may conform to the record of the case in the Patent Office.

Signed and sealed this 11th day of December, A. D. 1951.

[SEAL]

THOMAS F. MURPHY,
*Assistant Commissioner of Patents.*